ved Dec. 27, 1960

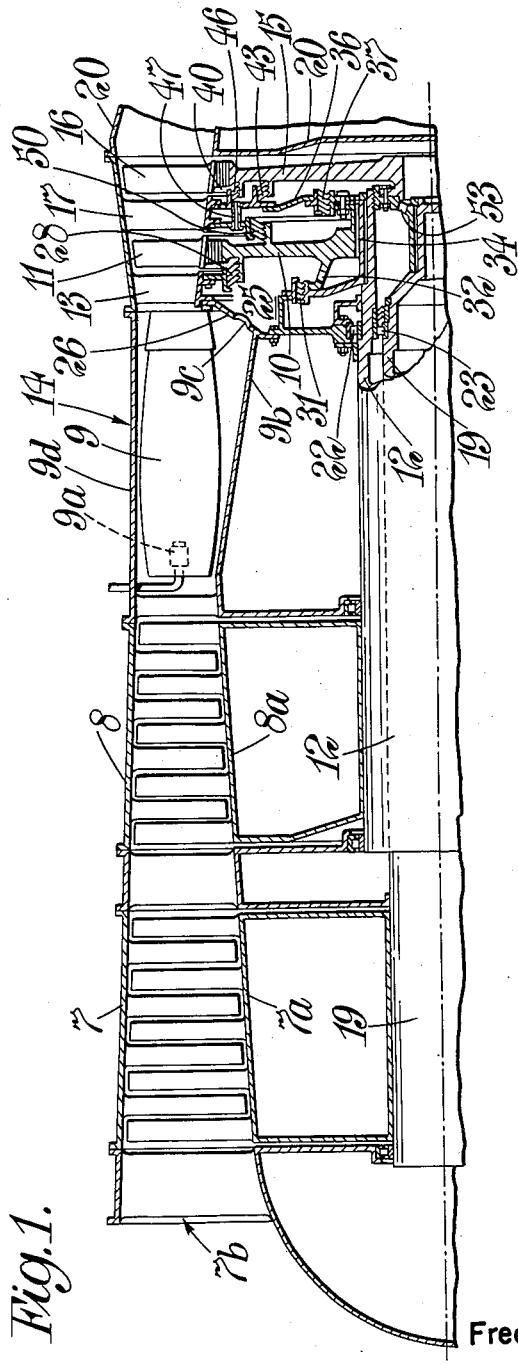

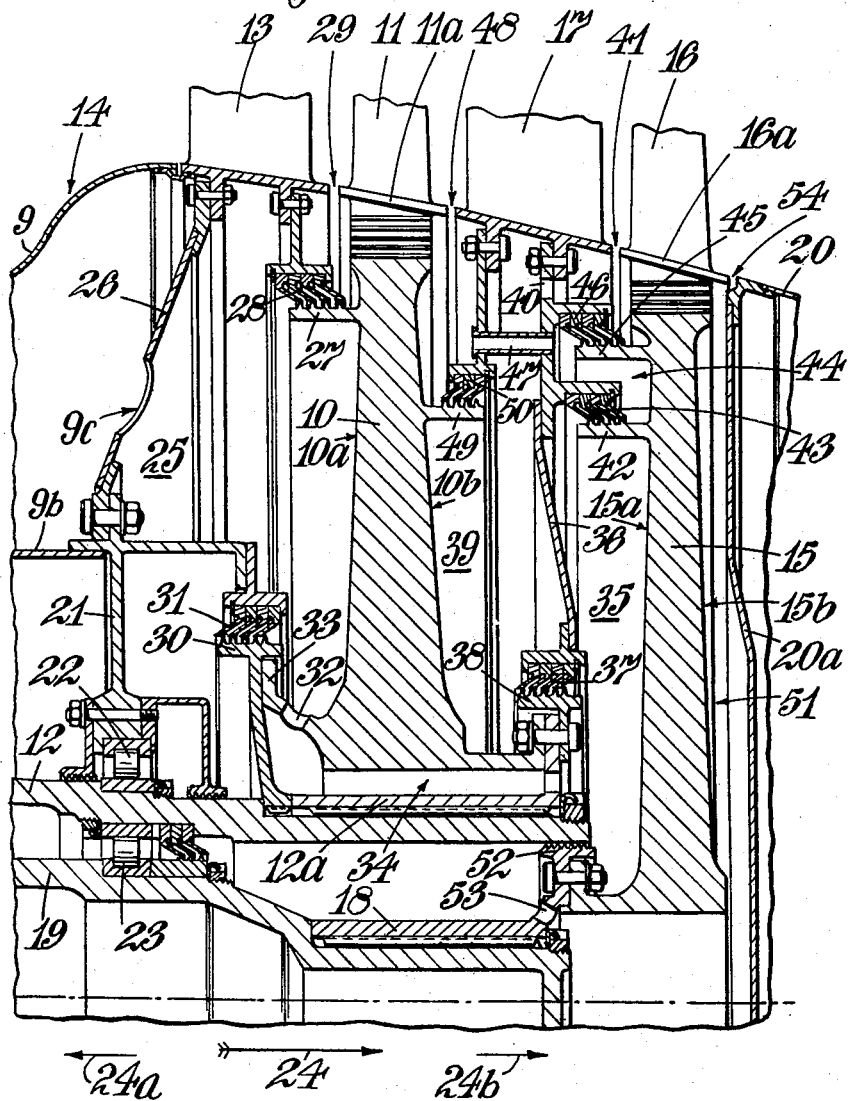

United States Patent Office

2,966,296

GAS-TURBINE ENGINES WITH LOAD BALANCING MEANS

Frederick William Walton Morley, Castle Donington, Nelson Hector Kent, Allestree, and Leslie James Pratt, Allenton, England, assignors to Rolls-Royce Limited, Derby, England, a British company Filed July 25, 1955, Ser. No. 524,032

Claims priority, application Great Britain Aug. 13, 1954

6 Claims. (Cl. 230—116)

This invention relates to gas-turbine engines and is concerned more specifically with gas-turbine engines of the kind provided with means to balance axial loads on the rotor assemblies of the engine.

According to the present invention, in a gas-turbine engine having a plurality of coaxial turbine discs, there is provided means to supply pressure air to the surfaces of each of the turbine discs for axial-load-balancing purposes, and said means is adapted so that there is a pressure drop across each of the turbine discs from one side thereof to the other, and so that the pressure drops across them are in the same sense.

According to a feature of the invention, the source of pressure air is a compressor of the gas turbine engine and pressure air is caused to flow first to one chamber having the upstream side of one of the turbine discs as a wall thereof and then to another chamber and also in a manner creating a pressure loss to a further chamber, said other chamber having the upstream side of another of the turbine discs as a wall thereof and said further chamber having the downstream side of said one of the turbine discs as a wall thereof, and pressure air is also caused to flow to the downstream side of said other of the turbine discs in a manner creating a pressure loss, so that the pressure on the downstream side of said other turbine disc is lower than the pressure in said other chamber.

Preferably said one chamber has the upstream side of the upstream turbine disc as a wall thereof, said other chamber has the upstream side of the next adjacent turbine disc in the downstream direction as a wall thereof, said further chamber has the downstream side of the upstream turbine disc as a wall thereof, and pressure air is also caused to flow from said other chamber to the downstream side of the next adjacent turbine disc in a manner creating a pressure loss. Preferably, moreover, pressure air flows to said further chamber from said other chamber. The air may also flow from said one chamber to said other chamber in a manner creating a pressure loss.

According to another feature of the invention there may be provided a diaphragm between the upstream turbine disc and the next adjacent turbine disc separating said further chamber from said other chamber, and it may be arranged that the pressure in said other chamber is higher than the pressure in said further chamber so that a load in the upstream direction is applied to the diaphragm, and the diaphragm may be attached to the nozzle guide vanes associated with the next adjacent disc so that the upstream load assists in balancing the downstream load on the nozzle guide vanes.

Preferably the chambers have outlets to the working fluid passage of the turbine so that the air may also be used for sealing purposes to prevent the flow of hot gas along the turbine discs, and these outlets are conveniently provided with labyrinth-type seals. Preferably, moreover, the restrictions necessary in the flow path of the air to create in part at least the said pressure drops are formed by labyrinth-type seals.

One embodiment of the invention having means to create axial loads on the turbine discs of a gas-turbine engine will now be described with reference to the accompanying drawing, in which Figure 1 illustrates diagrammatically a compound gas turbine engine, and Figure 2 illustrates a turbine of such an engine constructed in accordance with one example of this invention.

In Figure 1, there is illustrated diagrammatically a compound gas turbine engine and it comprises in flow series arrangement a low-pressure compressor 7 having a rotor 7a and an air intake 7b, a high-pressure compressor 8 having a rotor 8a, the high-pressure compressor 8 receiving air compressed in the low-pressure compressor 7, combustion equipment 9 having fuel injectors 9a, the fuel from the injectors being burnt with air from the high-pressure compressor 8, a high-pressure turbine having a rotor 10, 11, and a low-pressure turbine having a rotor 15, 16. The low-pressure compressor rotor 7a and turbine rotor 15, 16 are drivingly connected by shaft 19 and, in operation, an axial load is applied to the shaft 19 by the compressor rotor 7a acting in a direction from the turbine rotor 15, 16 towards the compressor rotor 7a. The high-pressure compressor rotor 8a is connected to the high-pressure turbine rotor 10, 11 by a shaft 12 and in operation, an axial load is applied to the shaft 12 by the compressor rotor acting in a direction from the turbine rotor 10, 11 towards the compressor rotor 8a.

Referring now to Figure 2 of the drawings, there is illustrated in greater detail the turbine structure of the gas-turbine engine shown in Figure 1. The upstream or high-pressure turbine rotor comprises a disc 10 carrying rotor blades 11, and the disc 10 is mounted through a splined sleeve 12a on the shaft 12 by which the turbine disc 10 is connected to the rotor of a high-pressure section of the compressor system of the engine. The engine also comprises a nozzle-guide vane assembly 13 through which the hot gases from the combustion equipment 14 pass to impinge upon the rotor blades 11.

The low-pressure rotor comprises a disc 15 which carries at its periphery a ring of rotor blades 16 to which the hot gases exhausting from the blades 11 flow after passing through interstage nozzle guide vanes 17. The low-pressure turbine disc 15 is mounted, through a splined sleeve 18 bolted to it, on the end of the low-pressure shaft 19 by which the turbine disc 15 is connected to the low-pressure section of the compressor system of the compound engine.

The engine also comprises an exhaust assembly through which the exhaust gases pass to atmosphere and comprising as part thereof a cone or bullet 20 whereof the base is indicated at 20a.

The shaft 12 is mounted in bearings in load-taking stator structure 21 of the engine, one of the bearings being indicated at 22. A corresponding bearing 23 supports the shaft 19 relative to the shaft 12.

There is also illustrated in the drawing means for creating in the shafts 12 and 19 axial loads in the direction of arrow 24, the purpose of which is to balance, at least in part, the axial loads acting on the rotor assemblies in the opposite direction (as indicated by arrow 24a) due to the respective compressor rotors 8a, 7a. The loads acting in the direction of the arrow 24a may also be in part balanced by loads (acting in the direction of arrow 24b) due to the reaction of the working gas on the blades 11, 16.

The means comprises a connection, say through the air casing 9b of the combustion equipment and ports 9c, from the delivery side of the compressor system of the engine to a chamber 25 within the ring of nozzle guide vanes 13 and bounded on one side by a diaphragm 26 and on the other side by the upstream surface 10a of the high-pressure turbine disc 10. The disc 10 has an axial flange 27 provided on it adjacent its periphery and the flange has radial ribs forming the rotating parts of a labyrinth seal whereof the stationary parts 28 are carried by the nozzle-guide-vane assembly. The labyrinth seal 27, 28 forms an outlet from the chamber 25 to the gap 29 between the inner shrouds of the nozzle guide vanes 13 and the inner platforms 11a of the blades 11 and allows pressure air to bleed from the chamber 25 to prevent hot gases flowing inwardly through the gap 29.

Adjacent its centre the disc 10 has associated with it a further labyrinth seal having a rotating part 30 secured to the shaft 12 and a stationary part 31 secured to the stator structure 21 to avoid losses of pressure air from the chamber 25 to within the stator structure 21.

A further outlet is provided from the chamber 25 in the form of ports 32 through a flange 33 at the centre of the disc 10, the ports leading to a bore 34 extending through the disc 10 to its downstream side.

The air flows from the bore 34 into a second chamber 35 whereof one wall is formed by a diaphragm 36 supported internally of the interstage nozzle guide vanes 17 and whereof a second wall is formed by the upstream surface 15a of the downstream or low-pressure disc 15. There is a slight loss of pressure as between the chamber 25 and the chamber 35 and the pressure within the chamber 35 may be for instance about four fifths of that in chamber 25.

The diaphragm 36 carries adjacent its centre the stationary parts 37 of a further labyrinth seal, whereof the rotating parts are afforded by an externally ribbed ring 38 carried by the high-pressure disc 10, and the labyrinth seal 37, 38 provides an outlet which leads from the chamber 35 to a third chamber 39, whereof one wall is formed by the diaphragm 36 and a second wall is formed by the downstream side 10b of the high-pressure or upstream disc 10. It may be arranged, for instance, that in flowing through the labyrinth seal 37, 38, there is a substantial pressure loss, so that, for instance, the pressure within chamber 39 is about half that in chamber 35.

The air from the chamber 39 flows outwardly and passes through ports 40 in structure associated with and carried by the interstage guide vanes 17 to provide sealing air to prevent the inward flow of hot gas through the gap 41 between the inner shrouds of the interstage guide vanes 17 and the inner platforms 16a of the rotor blades 16. The pressure at this point may be slightly under half that in chamber 35. Further sealing air for this gap 41 is obtained from the chamber 35 via a pair of labyrinth seals arranged in series. The first of these labyrinth seals comprises a ribbed axial flange 42 on the disc 15 adjacent its periphery, the flange having radial ribs to co-operate with stationary seal members 43 carried by the interstage guide vane structure, and air from the chamber 35 passes through this labyrinth seal 42, 43 into a chamber 44. The air flows from this chamber partly to the gap 41 through the second labyrinth seal, which is formed by a second ribbed axial flange 45 on the disc 15 and second stationary sealing elements 46 carried by the interstage guide vane structure, and partly through tubes 47 to close to the periphery of the high-pressure turbine disc 10 at its downstream side, thereby to provide sealing air for the gap 48 between the downstream edges of the platforms 11a and the upstream edges of the inner shrouds of the vanes 17. It may, for instance, be arranged that the pressure within the chamber 44 is about two-thirds of the pressure in chamber 35 and that the pressure of the sealing air for the gap 48 is slightly less than that in chamber 44, and thus somewhat greater than the pressure in chamber 39. A labyrinth seal is provided between the chamber 39 and the space leading to the gap 48, this labyrinth seal being formed by a ribbed axial flange 49 on the high-pressure disc 10 and stationary sealing elements 50 carried by the interstage guide vane structure.

Only part of the air from the chamber 35 flows into the chambers 39 and 44 and the remainder passes to the space 51 between the downstream surface 15b of the disc 15 and the base 20a of the cone or bullet 20. This air flows from the chamber 35 via a labyrinth seal formed by the surface of the bore of the shaft 12 and a ribbed flange 52 on the downstream end of the splined sleeve 18, and through ports 53 into a central bore in the low-pressure disc 15 and thence into the space 51. It may be arranged for instance, that the pressure in the space 51 is about two fifths of the pressure in chamber 35 and the air flowing into this space also provides sealing air for the gap 54 between the downstream edges of the platforms 16a and the upstream edge of the bullet 20.

It will be seen that with this construction there is a substantial pressure drop across each of the discs 10 and 15, the higher pressure being in each case on the upstream side of the disc, so that axial loads are produced in the shafts 12, 19 to assist in balancing the axial loads acting on the shafts due to the compressor rotor sections to which the shafts 12 and 19 are connected.

The pressure drops through the labyrinth seals may be predetermined by suitably selecting the number of co-operating ribs and stationary parts and their clearance, and the pressure drops across ports 32, 40 and 53 may be predetermined by suitably selecting their number and areas.

We claim:

1. A gas turbine comprising axially-spaced upstream and downstream rotor discs; compressor means including a compressor rotor drivingly connected to the rotor discs and in operation applying to the rotor discs axial loads which act in the upstream direction; stator structure wherein said rotor discs are rotatively mounted, said stator structure including first wall means co-operating with the upstream surface of the upstream disc to define a first chamber, second wall means between the discs and co-operating with the discs to define a second chamber with the downstream side of the upstream disc and a third chamber with the upstream side of the downstream disc, and third wall means defining a space with the downstream side of the downstream disc; said compressor means being connected to said first and third chambers to supply air under high pressure thereto and being connected with said second chamber and said space through means creating a pressure drop whereby the pressures in said first and third chambers are substantially higher than those within said second chamber and said space.

2. A gas turbine according to claim 1, wherein said compressor means is connected to deliver air under pressure into said first chamber, and comprising means affording a flow connection between said first and third chambers in which a small loss of pressure is created in the air flowing from the first chamber to the third chamber, and wherein said means creating a substantial pressure drop is connected in flow series between said third and second chambers and also between said third chamber and said space whereby the pressures in said second chamber and in said space are substantially lower than the pressure in said third chamber.

3. A gas turbine according to claim 2, wherein said means creating a substantial pressure loss in the air flow between said third and second chambers and between said third chamber and said space comprises labyrinth type gas seals.

4. A gas turbine comprising compressor means; axially-spaced upstream and downstream turbine rotor discs having peripheral blading; shafting drivingly connecting said turbine discs and said compressor means, said compressor means in operating on working fluid of the engine producing an axial load in the shafting opposite to and greater than an axial load produced in the shafting by the working fluid acting on the turbine blading, whereby the shafting is subjected to a residual axial load directed towards the compressor means; turbine stator structure wherein said rotor discs are rotatively mounted, said stator structure including first wall means co-operating with the upstream surface of the upstream disc to define a first chamber, second wall means between the discs and co-operating with the discs to define a second chamber with the downstream side of the upstream disc and a third chamber with the upstream side of the downstream disc, and third wall means defining a space with the downstream side of the downstream disc; the first and third chambers being connected to said compressor to receive therefrom air at high pressure, and restrictive connections between said compressor on the one hand and said second chamber and said space on the other hand, whereby the pressures in said second chamber and said space are lower than the pressures in said first and third chambers respectively and whereby each said disc is subjected to a pressure load which acts in direction opposite to said residual load in the shafting.

5. A gas turbine comprising compressor means having a low-pressure section and a high-pressure section; an upstream turbine rotor disc; a first shaft interconnecting said high-pressure section of the compressor means and said upstream turbine rotor disc; a downstream turbine rotor disc axially spaced from said upstream turbine rotor disc on the side thereof remote from the compressor means; a second shaft interconnecting said downstream turbine rotor disc and the low-pressure section of the compressor means; each of said sections of the compressor means producing, in operating on the working fluid of the engine, an axial load in the shaft by which it is connected to its associated turbine rotor disc, which axial load is opposite to and greater than an axial load produced in the respective shaft by the working fluid acting on the associated turbine rotor, whereby the shafts are subjected to residual axial loads directed towards the compressor means; turbine stator structure wherein said rotor discs are rotatively mounted, said stator structure including first wall means co-operating with the upstream surface of the upstream disc to define a first chamber, second wall means between the discs and cooperating with the discs to define a second chamber with the downstream side of the upstream disc and a third chamber with the upstream side of the downstream disc, and third wall means defining a space with the downstream side of the downstream disc; the first and third chambers being connected to said compressor to receive therefrom air at high pressure, and flow-restricting connections between the third chamber on the one hand and said second chamber and said space on the other hand whereby the pressures within said second chamber and said space are lower than the pressures in said first and third chambers respectively and whereby each said turbine rotor disc is subjected to a pressure load which acts in the direction opposite to said residual load and its associated shaft.

6. A gas turbine comprising axially-spaced upstream and downstream rotor discs; a compressor including a compressor rotor drivingly connected to the rotor discs and in operation applying to the rotor discs axial loads which act in the upstream direction; stator structure wherein said rotor discs are rotatively mounted, said stator structure including first wall means co-operating with the upstream surface of the upstream disc to define a first chamber, second wall means between the discs and cooperating with the discs to define a second chamber with the downstream side of the upstream disc and a third chamber with the upstream side of the downstream disc, and third wall means defining a space with the downstream side of the downstream disc; a working fluid passage for the turbine; a row of rotor blading at the periphery of each of said discs extending into said working fluid passage; flow interconnections between said first, second and third chambers and said working fluid passage, said flow connections being labyrinth type seals between stationary and rotating structure; said compressor forming a source of high-pressure air; and means connecting said source to said first and third chambers to supply air thereto at high pressure, and labyrinth seal means connecting said second chamber and said space with said third chamber to receive air therefrom at a pressure lower than the pressure in said first and third chambers.

References Cited in the file of this patent
UNITED STATES PATENTS

| 949,440 | Richardson et al. | Feb. 15, 1910 |
| 1,593,414 | Kraft | July 20, 1926 |
| 2,410,769 | Baumann | Nov. 5, 1946 |
| 2,429,681 | Griffith | Oct. 28, 1947 |
| 2,475,316 | Garraway | July 5, 1949 |
| 2,524,724 | Zetterquist | Oct. 3, 1950 |
| 2,715,367 | Kodet et al. | Aug. 16, 1955 |
| 2,722,101 | Wosika | Nov. 1, 1955 |
| 2,746,671 | Newcomb | May 22, 1956 |
| 2,749,087 | Blackman et al. | June 5, 1956 |

FOREIGN PATENTS

| 670,710 | Great Britain | Apr. 23, 1952 |
| 696,133 | Great Britain | Aug. 26, 1953 |
| 709,210 | Great Britain | May 19, 1954 |